(12) United States Patent
Euzen et al.

(10) Patent No.: US 7,807,598 B2
(45) Date of Patent: *Oct. 5, 2010

(54) MESOSTRUCTURED MATERIAL WITH A HIGH ALUMINUM CONTENT

(75) Inventors: Patrick Euzen, Paris (FR); Alexandra Chaumonnot, Lyons (FR); Aurelie Coupe, Noisiel (FR); Clement Sanchez, Gif-sur-Yvette (FR); Cedric Boissiere, Paris (FR); David Grosso, Rueil Malmaison (FR)

(73) Assignee: IFP Energies Nouvelles, Rueil Malmaison Cedex (FR)

( * ) Notice: Subject to any disclaimer, the term of this patent is extended or adjusted under 35 U.S.C. 154(b) by 117 days.

This patent is subject to a terminal disclaimer.

(21) Appl. No.: 11/889,891

(22) Filed: Aug. 17, 2007

(65) Prior Publication Data

US 2009/0029847 A1    Jan. 29, 2009

Related U.S. Application Data

(63) Continuation of application No. PCT/FR2006/001112, filed on May 17, 2006.

(30) Foreign Application Priority Data

Jun. 2, 2005    (FR) .................................. 05/05678

(51) Int. Cl.
*B01J 29/06* (2006.01)
(52) U.S. Cl. ............................. 502/71; 502/63; 502/64; 502/69; 502/70
(58) Field of Classification Search ........................ None
See application file for complete search history.

(56) References Cited

U.S. PATENT DOCUMENTS

| | | | |
|---|---|---|---|
| 4,217,240 A | 8/1980 | Bergna | |
| 4,925,820 A * | 5/1990 | Hoek et al. | .................. 502/66 |
| 5,192,520 A | 3/1993 | Delprato et al. | |
| 6,387,453 B1 | 5/2002 | Brinker et al. | |
| 6,592,764 B1 | 7/2003 | Stuckey et al. | |
| 6,866,925 B1 | 3/2005 | Chane-Ching | |
| 2002/0131930 A1 | 9/2002 | Pinnavaia et al. | |
| 2004/0192947 A1 | 9/2004 | Chane-Ching et al. | |
| 2006/0030477 A1 | 2/2006 | Chaumonnot et al. | |
| 2006/0292054 A1 | 12/2006 | Chaumonnot et al. | |

FOREIGN PATENT DOCUMENTS

| | | |
|---|---|---|
| FR | 2800300 | 5/2001 |
| WO | WO 9937705 | 7/1999 |

OTHER PUBLICATIONS

P. Prokesova, S. Mintova, J. Cejka, T. Bein, "Preparation of nanosized micro/mesoporous composites via simultaneous synthesis of Beta/MCM-48 phases," 2003, Elsevier, Microporous and Mesoporous Materials 64 (2003) 165-174.*
Galo J. De A.A. Soler-Illia; Clement Sanchez, Benedicte Lebeau, Joel Patarin: "Chemical Strategies to Design Textured Materials: From Microporous and Mesoporous Oxides to Nanonetvvorks and Hierarchical Structures" Chem. Rev., vol. 102, Oct. 25, 2002 pp. 4093-4138, XP002308089.
C.J. Brinker, Y.Lu, A. Sellinger, H. Fan: "Evaporation Induced Self-Assembly Nanostructures Made Easy" Advanced Materials, vol. 11, No. 7, 1999, pp. 579-585, XP002308090.
Arne Karlsson, Michael Stoecker, Ralf Schmidt: "Composites of Micro- and Mesoporous Materials: Simultaneous Syntheis of MFI/MCM-41 Like Phases by a Mixed Template Approach" Microporous and Microporous Materials, vol. 27, 1999, pp. 181-192, XP002308091.

* cited by examiner

*Primary Examiner*—Melvin C Mayes
*Assistant Examiner*—Colin W Slifka
(74) *Attorney, Agent, or Firm*—Millen, White, Zelano, Branigan, P.C.

(57) ABSTRACT

A mesostructured material that consists of at least two elementary spherical particles, each of said particles comprising a mesostructured matrix based on aluminum oxide and having a pore size of between 1.5 and 30 nm, an aluminum oxide content that represents more than 46% by weight relative to the mass of said matrix, which has amorphous walls with a thickness of between 1 and 30 nm and whereby said elementary spherical particles have a maximum diameter of 10 μm, is described. Said mesostructured matrix can also contain silicon oxide. Each of the spherical particles of the mesostructured material can also contain zeolitic nanocrystals so as to form a material with a mixed porosity that is both mesostructured and zeolitic in nature. The preparation of said material is also described.

12 Claims, 2 Drawing Sheets

MESOSTRUCTURED MATERIAL WITH A HIGH ALUMINUM CONTENT

This application is a continuation of International Application PCT/FR06/01112 filed May 17, 2006, which claims benefit of priority from French Application 05/05.678 filed Jun. 2, 2005.

TECHNICAL FIELD

This invention relates to the field of mesostructured materials that are based on aluminum oxide. It also relates to the field of mesostructured materials with a high aluminum content that have a hierarchized or mixed porosity in the field of microporosity and mesoporosity. It also relates to the preparation of these materials that are obtained by the use of the so-called "aerosol" synthesis technique.

PRIOR ART

The new strategies of synthesis that make it possible to obtain materials with a well-defined porosity in a very wide range, going from microporous materials to macroporous materials by passing through materials with hierarchized or mixed porosity, i.e., having pores of several sizes, have been undergoing a very extensive development within the scientific community since the mid-1990's (G. J. of A. A. Soler-Illia, C. Sanchez, B. Lebeau, J. Patarin, Chem. Rev., 2002, 102, 4093). Materials whose pore size is controlled are obtained. In particular, the development of so-called "fine chemistry" synthesis methods led to the development of low-temperature mesostructured materials by the coexistence in aqueous solution or in polar solvents of inorganic precursors with structuring agents, generally molecular or supramolecular, ionic or neutral surfactants. The monitoring of the electrostatic interactions or by hydrogen bonds between the inorganic precursors and the structuring agent jointly linked to hydrolysis/condensation reactions of the inorganic precursor leads to a cooperative assembly of organic and inorganic phases that generate micellar aggregates of surfactants of uniform size that are monitored within an inorganic matrix. This cooperative self-assembly phenomenon, controlled, i.a., by the concentration of structuring agent, can be induced by gradual evaporation of a reagent solution whose structuring agent concentration is most often less than the critical micellar concentration, which leads either to the formation of mesostructured films in the case of a deposit on a substrate ("dip-coating" technique) or to the formation of a mesostructured powder after the solution is sprayed (aerosol technique). By way of example, the U.S. Pat. No. 6,387,453 discloses the formation of mesostructured organic-inorganic hybrid films by the "dip-coating" technique, whereby these same authors have furthermore used the aerosol technique for developing mesostructured, purely silicic materials (C. J. Brinker, Y. Lu, A. Sellinger, H. Fan, Adv. Mater., 1999, 11, 7). The release of the pores is then obtained by elimination of the surfactant, the latter conventionally being carried out by chemical extraction processes or by heat treatment. Based on the nature of the inorganic precursors and the structuring agent that is used as well as operating conditions that are imposed, several mesostructured material families have been developed. For example, the M41S family initially developed by Mobil (J. S. Beck, J. C. Vartuli, W. J. Roth, M. E. Leonowicz, C. T. Kresge, K. D. Schmitt, C. T.-W. Chu, D. H. Olson, E. W. Sheppard, S. B. McCullen, J. B. Higgins, J. L. Schlenker, J. Am. Chem. Soc., 1992, 114, 27, 10834), consisting of mesoporous materials that are obtained via the use of ionic surfactants such as quaternary ammonium salts, having a generally hexagonal, cubic or lamellar structure, pores of a uniform size in a range of 1.5 to 10 nm, and amorphous walls with a thickness on the order of 1 to 2 nm, has been studied extensively. Subsequently, so as to increase the properties of hydrothermal stability while developing acido-basicity properties relative to these materials, the incorporation of the aluminum element into the amorphic silicon framework by direct synthesis or by post-synthesis processes has been considered in particular, whereby the aluminosilicate materials that are obtained have an Si/Al molar ratio in a range of 1 to 1000 (S. Kawi, S. C. Shen, Stud. Surf. Sci. Catal., 2000, 129, 227; S. Kawi, S. C. Shen, Stud. Surf. Sci. Catal., 2000, 129, 219; R. Mokaya, W. Jones, Chem. Commun., 1997, 2185). The hydrothermal stability properties and the acido-basicity properties that are thus developed by these aluminosilicates have not, however, allowed their use in an industrial stage in processes of refining or petrochemisty, which gradually lead to the use of new structuring agents such as amphiphilic macromolecules of block copolymer type, the latter leading to mesostructured materials that have a generally hexagonal, cubic or lamellar structure, pores of uniform size in a range of 4 to 50 nm, and amorphous walls with a thickness in a range of 3 to 7 nm. Based on the structure and the degree of organization desired for the final mesostructured material, the synthesis methods that are used can take place in an acid medium (pH$\leq$1) (WO 99/37705) or in a neutral medium (WO 96/39357), whereby the nature of the structuring agent that is used also plays a predominant role. The mesostructured aluminosilicate materials that are thus obtained have increased hydrothermal stability properties relative to their homologs that are synthesized by means of other structuring agents, their acido-basicity properties remaining approximately similar (1<Si/Al<1000). Low values of the Si/Al molar ratio such as Si/Al<20 are difficult to obtain, however, because it is not easy to incorporate large amounts of aluminum into the material via these particular operating processes (D. Zhao, J. Feng, Q. Huo, N. Melosh, G. H. Fredrickson, B. F. Chmelka, G. D. Stucky, Science, 1998, 279, 548; Y.-H. Yue, A. Gédéon, J.-L. Bonardet, J. B. d'Espinose, N. Melosh, J. Fraissard, Stud. Surf Sci. Catal., 2000, 129, 209).

Furthermore, many works have been undertaken for the purpose of developing aluminosilicate materials that have both the advantages of an organized mesoporous structure and those of a microcrystalline network. Several synthesis techniques that make possible the development of mixed or composite mesostructured/zeolite materials thus have been listed in open literature. A first synthesis technique consists in synthesizing, in a first stage, a mesostructured aluminosilicate material according to the conventional methods explained above, then, in a second stage, in impregnating this material with a structuring agent that is usually used in the synthesis of zeolitic materials. A suitable hydrothermal treatment leads to a zeolitization of the amorphous walls of the initial mesostructured aluminosilicate (U.S. Pat. No. 6,669, 924). A second synthesis technique consists in putting a colloidal solution of zeolite nuclei into the presence of a structuring agent that is usually used for creating mesostructuring of the final material. The development of an inorganic matrix with organized mesoporosity and the increase within this matrix of the zeolite nuclei, so as to obtain a mesostructured aluminosilicate material that has crystallized walls, are simultaneous (Z. Zhang, Y. Han, F. Xiao, S. Qiu, L. Zhu, R. Wang, Y. Yu, Z. Zhang, B. Zou, Y. Wang, H. Sun, D. Zhao, Y. Wei, J. Am. Chem. Soc., 2001, 123, 5014; Y. Liu, W. Zhang, T. J. Pinnavaia, J. Am. Chem. Soc., 2000, 122, 8791). A variant with these two techniques initially consists in the preparation of a mixture of aluminum and silicon precursors in the presence of two structuring agents, one that can generate a zeolitic system, and the other that can generate a mesostructuring. This solution is then subjected to two crystallization stages with variable hydrothermal treatment conditions, a first stage that leads to the formation of the mesoporous structure with organized porosity and a second stage that leads to the zeolitization of the amorphous walls (A. Karlsson, M. Stöcker, R. Schmidt, *Micropor. Mesopor. Mater.*, 1999, 27, 181). The group of these synthesis methods exhibits the drawback of damaging the mesoporous structure and therefore of losing the advantages of the latter in the case where the growth of the zeolite nuclei or the zeolitization of the walls is not completely controlled, which makes these techniques delicate to implement. It is possible to avoid this phenomenon by directly developing mesostructured/zeolite composite materials. This can be done by heat treatment of a mixture of a solution of zeolite nuclei and a solution of mesostructured aluminosilicate nuclei (P. Prokesova, S. Mintova, J. Cejka, T. Bein, *Micropor. Mesopor. Mater.*, 2003, 64, 165) or else by growth of a zeolite layer on the surface of a presynthesized mesostructured aluminosilicate (D. T. On, S. Kaliaguine, *Angew. Chem. Int. Ed.*, 2002, 41, 1036). From an experimental standpoint, entirely unlike the "dip-coating" or "aerosol" techniques described previously, the aluminosilicate materials with thus defined hierarchized porosity are not obtained by a gradual concentration of inorganic precursors and of the structuring agent(s) within the solution where they are present but are conventionally obtained by direct precipitation within an aqueous solution or in polar solvents by manipulating the value of the critical micellar concentration of the structuring agent. In addition, the synthesis of these materials obtained by precipitation requires an ageing stage in an autoclave, and all the reagents are not integrated with products in a stoichiometric amount since they can be found in the supernatant. The elementary particles that are usually obtained do not have a uniform shape and are characterized in general by a size varying in general between 200 and 500 nm and sometimes more.

SUMMARY

The invention relates to a mesostructured material that consists of at least two elementary spherical particles, each of said particles comprising a mesostructured matrix that is based on aluminum oxide, having a pore size of between 1.5 and 30 nm and an aluminum oxide content that represents more than 46% by weight relative to the mass of said matrix, which has amorphous walls with a thickness of between 1 and 30 nm, whereby said elementary spherical particles have a maximum diameter of 10 µm. Said mesostructured matrix that is based on aluminum oxide preferably comprises silicon oxide in a proportion such that the Si/Al molar ratio of said matrix is strictly less than 1.

Each of said elementary spherical particles can also comprise zeolitic nanocrystals that have a pore size of between 0.2 and 2 nm such that said material according to the invention has a mixed porosity that is both mesostructured and zeolitic in nature.

This invention also relates to the preparation of the material according to the invention. A process for the preparation of the mesostructured material according to the invention comprises a) the mixing in solution of at least one surfactant, at least one aluminum precursor, and optionally at least one silica precursor; b) the aerosol spraying of the solution obtained in stage a) to lead to the formation of spherical droplets of a diameter that is less than or equal to 200 µm; c) the drying of said droplets, and d) the elimination of said surfactant to obtain a mesostructured material. For the preparation of a mesostructured/zeolitic mixed material, for example, a preliminary stage $a_o$) that consists in the synthesis, in the presence of at least one structuring agent, of zeolitic nanocrystals of a maximum nanometric size that is equal to 300 nm is initiated so as to obtain a colloidal solution in which said nanocrystals are dispersed, or it is possible, according to stage a), to introduce into the mixture zeolitic crystals that exhibit the characteristic of dispersing in the form of nanocrystals of a maximum nanometric size that is equal to 300 nm in solution. The ordered structure of the matrix of each of the spherical particles that constitute the material according to the invention is consecutive to the phenomenon of micellization or self-assembly by evaporation induced by the so-called aerosol technique.

ADVANTAGE

The mesostructured material according to the invention is a material that consists of elementary spherical particles, each of said particles comprising a mesostructured matrix that has a high aluminum content. Said mesostructured matrix can also contain silicon oxide, which, in this case, imparts advantageous acido-basicity properties to the material according to the invention. This invention also offers a material with mixed porosity in which zeolitic nanocrystals are trapped in the mesostructured matrix, whereby such a material is advantageous because it simultaneously has structural, textural and acido-basicity properties that are specific to the materials of the zeolite family and to the materials based on aluminum oxide, more particularly to the mesostructured aluminosilicate materials. The ordered structure of the material according to the invention being consecutive to the phenomenon of micellization or self-assembly by evaporation induced by the so-called aerosol technique makes it possible to easily develop mesostructured materials, with or without the presence of zeolitic nanocrystals, without damaging the nature of the mesostructured phase nor that of the optionally present zeolitic phase and to work with an extensive range of zeolite nanocrystals regardless of their initial synthesis processes. Actually, for the preparation of a material with a mesostructured/zeolitic mixed porosity, it is possible to use zeolitic crystals of a size much larger than 300 nm since they have the property of dispersing in solution, in particular in acidic solution and very preferably in acidic aqueous organic solution, in the form of nanocrystals of a maximum nanometric size that is equal to 300 nm. Furthermore, the development on the nanometer scale of a mesostructured/zeolitic material leads to a preferred connection of microporous and mesoporous zones within the same spherical particle.

In addition, the mesostructured material according to the invention, with or without the presence of zeolitic nanocrystals, consisting of spherical elementary particles, the diameter of these particles varying advantageously from 50 nm to 10 µm and preferably from 50 to 300 nm, the limited size of these particles as well as their homogeneous shape make it possible to have a better diffusion of reagents and products of the reaction during the use of the material according to the invention in potential industrial applications compared to materials that are known from the prior art that come in the form of elementary particles of non-homogeneous shape, i.e., irregular, and of a size much larger than 500 nm.

In addition, relative to the known syntheses of mesostructured materials, the preparation of the material according to the invention is carried out continuously, the preparation period is reduced (several hours as opposed to 12 to 24 hours by using autoclaving), and the stoichiometry of the non-volatile radicals that are present in the initial solution of the reagents is maintained in the material of the invention.

SPECIFICATION OF THE INVENTION

The object of this invention is a mesostructured material that consists of at least two elementary spherical particles, each of said particles comprising a mesostructured matrix based on aluminum oxide and having a pore size of between 1.5 and 30 nm and an aluminum oxide content representing more than 46% by weight relative to the mass of said matrix, which has amorphous walls of a thickness of between 1 and 30 nm, whereby said elementary spherical particles have a maximum diameter of 10 µm.

In terms of this invention, mesostructured material is defined as a material that has at least an organized porosity on the scale of mesopores of each of said spherical particles, i.e., a porosity organized on the scale of the pores that have a uniform size of between 1.5 and 30 nm and preferably between 1.5 and 10 nm and distributed homogeneously and uniformly in each of said particles (mesostructuring of the material). More specifically, within the scope of this invention, the mesostructuring of the material is associated with the matrix, included in said material; the matrix that is based on aluminum oxide, encompassed in each of said spherical particles that constitute the material according to the invention, is mesostructured. It has mesopores that have a uniform size of between 1.5 and 30 nm and preferably between 1.5 and 10 nm, distributed homogeneously and uniformly in each of said particles. It should be noted that a porosity that is microporous in nature can also result from the overlapping of the surfactant, used during the preparation of the material according to the invention, with the inorganic wall at the organic-inorganic interface developed during the mesostructuring of the inorganic component of said material according to the invention. The material that is located between the mesopores of the mesostructured matrix is amorphous and forms walls whose thickness is between 1 and 30 nm. The thickness of the walls corresponds to the distance that separates one pore from another pore. The organization of the mesoporosity described above leads to a structuring of the matrix based on aluminum oxide, which can be hexagonal, vermicular, cholesteric, lamellar, bicontinuous or cubic, and preferably vermicular. The material according to the invention also has an interparticulate textural macroporosity.

According to the invention, said elementary spherical particles that constitute the material according to the invention have a maximum diameter of 10 µm, which advantageously is between 50 nm and 10 µm, and very advantageously between 50 and 300 nm. More specifically, said particles are present in the material according to the invention in the form of aggregates.

The material according to the invention advantageously has a specific surface area of between 100 and 1200 m²/g, advantageously between 200 and 800 m² g, and very advantageously between 300 and 600 m²/g.

According to a first embodiment of the material according to the invention, the matrix that is based on aluminum oxide, mesostructured, is entirely aluminum.

According to a second embodiment of the material according to the invention, the matrix that is based on aluminum oxide, mesostructured, also comprises silicon oxide. The matrix, included in each of the spherical particles of the amount according to the invention, is in this case an aluminosilicate. The silicon oxide content in the aluminosilicate matrix is such that the Si/Al molar ratio is strictly less than 1.

According to a third embodiment of the material according to the invention, each of said spherical particles also comprises zeolitic nanocrystals that have a pore size of between 0.2 and 2 nm. The material according to the invention then has, on the scale of said spherical particles, not only an organized porosity on the scale of the mesopores having a uniform size of between 1.5 and 30 nm and preferably between 1.5 and 10 nm, distributed homogeneously and uniformly in each of said particles (mesostructuring as described above), but also a zeolitic-type microporosity whose characteristics (structural type of the zeolite, chemical composition of the zeolitic framework) are based on the selection of the zeolitic nanocrystals. According to the third embodiment of the material according to the invention, the zeolitic nanocrystals have a pore size of between 0.2 and 2 nm, preferably between 0.2 and 1 nm, and very preferably between 0.2 and 0.6 nm. Said nanocrystals generate the microporosity in each of the elementary spherical particles that constitute the material according to the invention. According to this third embodiment of the material according to the invention, said matrix can be either entirely silicic or can also comprise silicon oxide. In the specification below, the material according to the third embodiment will be called a mesostructured/zeolitic mixed material.

According to the third embodiment of the mesostructured material according to the invention, the zeolitic nanocrystals advantageously represent from 0.1 to 30% by weight, preferably from 0.1 to 20% by weight, and very preferably from 0.1 to 10% by weight of the material of the invention. Any zeolite, and, in particular, but not restrictively, those listed in the "Atlas of Zeolite Framework Types," 5$^{th}$ Revised Edition, 2001, Ch. Baerlocher, W. M. Meier, D. H. Olson, can be used in the zeolitic nanocrystals that are present in each of the elementary spherical particles that constitute the material according to the invention. The zeolitic nanocrystals preferably comprise at least one zeolite that is selected from among the zeolites ZSM-5, ZSM-48, ZSM-22, ZSM-23, ZBM-30, EU-2, EU-11, silicalite, beta, zeolite A, faujasite, Y, USY, VUSY, SDUSY, mordenite, NU-87, NU-88, NU-86, NU-85, IM-5, IM-12, ferrierite and EU-1. Very preferably, the zeolitic nanocrystals comprise at least one zeolite that is selected from among the zeolites of MFI, BEA, FAU and LTA structural type. Nanocrystals of different zeolites and in particular zeolites of structural types that are different can be present in each of the spherical particles that constitute the material according to the invention. In particular, each of the spherical particles that constitute the material according to the invention can comprise advantageously at least the first zeolitic nanocrystals whose zeolite is selected from among the zeolites ZSM-5, ZSM-48, ZSM-22, ZSM-23, ZBM-30, EU-2, EU-11, silicalite, beta, zeolite A, faujasite, Y, USY, VUSY, SDUSY, mordenite, NU-87, NU-88, NU-86, NU-85, IM-5, IM-12, ferrierite and EU-1, preferably from among the zeolites of MFI, BEA, FAU and LTA structural type and at least second zeolitic nanocrystals of which the zeolite is different from that of the first zeolitic nanocrystals and is selected from among the zeolites ZSM-5, ZSM-48, ZSM-22, ZSM-23, ZBM-30, EU-2, EU-11, silicalite, beta, zeolite A, faujasite, Y, USY, VUSY, SDUSY, mordenite, NU-87, NU-88, NU-86, NU-85, IM-5, IM-12, ferrierite and EU-1, preferably from among the zeolites of MFI, BEA, FAU and LTA structural type. The zeolitic nanocrystals advantageously comprise at least one zeolite that is either entirely silica or that contains, in addition to silicon, at least one element T that is selected from among aluminum, iron, boron, indium and gallium, preferably aluminum. The zeolitic nanocrystals have a maximum size of 300 nm and preferably have a size of between 30 and 200 nm.

The mesostructured material of this invention, having an entirely aluminum mesostructured matrix or that is aluminosilicate in nature and optionally having zeolite nanocrystals trapped within this matrix, can be obtained in the form of powder, balls, pellets, granules or extrudates, the shaping operations being carried out by the standard techniques that are known to one skilled in the art. The material according to the invention preferably is obtained in the form of powder, which consists of elementary spherical particles that have a maximum diameter of 10 µm, which facilitates the possible diffusion of compounds in the case of the use of the material according to the invention in a potential industrial application.

The object of this invention is also the preparation of the material according to the invention. First, it proposes providing a process for the preparation of mesostructured material according to the invention comprising an entirely aluminum mesostructured matrix or a matrix that is aluminosilicate in nature. Said process comprises: a) the mixing in solution of at least one surfactant, at least one aluminum precursor and optionally at least one silica precursor; b) the aerosol spraying of the solution that is obtained in stage a) for leading to the formation of spherical droplets of a diameter that is less than or equal to 200 µm; c) the drying of said droplets, and d) the elimination of said surfactant for obtaining a mesostructured material. In the specification below, said process is called "principal process for preparation according to the invention."

The aluminum precursor and optionally the silica precursor used in stage a) of the principal process for preparation according to the invention are inorganic oxide precursors that are well known to one skilled in the art. The aluminum precursor is advantageously an inorganic aluminum salt of formula $AlX_3$, whereby X is a halogen or the group $NO_3$. X is preferably chlorine. It is also possible to use aluminum sulfate $Al_2(SO_4)_3$ as an inorganic salt. The aluminum precursor can also be an organometallic precursor of formula $Al(OR'')_3$ where R''=ethyl, isopropyl, n-butyl, s-butyl or t-butyl or a chelated precursor such as aluminum acetyl acetone ($Al(C_5H_8O_2)_3$). The aluminum precursor can also be an oxide or a hydroxide of aluminum. The silica precursor, if it is present in stage a), is obtained from any silica source and advantageously from a sodium silicate precursor of formula $SiO_2$, NaOH, from a chlorinated precursor of formula $SiCl_4$, from an organometallic precursor of formula $Si(OR)_4$, where R=H, methyl, or ethyl, or from a chloroalkoxide precursor of formula $Si(OR)_{4-x}Cl_x$, where R=H, methyl or ethyl, whereby x is between 0 and 4. The silica precursor can also advantageously be an organometallic precursor of formula $Si(OR)_{4-x}R'_x$, where R=H, methyl, or ethyl, and R' is an alkyl chain or a functionalized alkyl chain, for example by a thiol, amino, β diketone, or sulfonic acid group, whereby x is between 0 and 4.

The surfactant that is used for the preparation of the mixture according to stage a) of the principal process for preparation according to the invention is an ionic or non-ionic surfactant or a mixture of the two. The ionic surfactant is preferably selected from among the phosphonium and ammonium ions and very preferably from among the quaternary ammonium salts such as cetyl trimethylammonium bromide (CTAB). The non-ionic surfactant preferably comes in the form of a copolymer that has at least two parts of different polarity that imparts to it amphiphilic macromolecule properties. It can be in particular a copolymer that is selected from the non-exhaustive list of the following copolymer families: the fluorinated copolymers ($-[CH_2-CH_2-CH_2-CH_2-O-CO-R1]-$ with $R1=C_4F_9$, $C_8F_{17}$, etc.), the biological copolymers such as the amine polyacids (poly-lysine, alginates, etc.), the dendrimers, the block copolymers that consist of poly(alkylene oxide) chains and any other copolymer with an amphiphilic nature that is known to one skilled in the art (S. Förster, M. Antionnetti, *Adv. Mater,* 1998, 10, 195-217, S. Förster, T. Plantenberg, *Angew. Chem. Int. Ed,* 2002, 41, 688-714, H. Cölfen, *Macromol. Rapid Commun,* 2001, 22, 219-252). Within the scope of this invention, a copolymer that is selected from among the family of block copolymers consisting of poly(alkylene oxide) chains is preferably used. Said block copolymer is preferably a block copolymer that has two, three or four blocks, whereby each block consists of a poly(alkylene oxide) chain. For a two-block copolymer, one of the blocks consists of a poly(alkylene oxide) chain that is hydrophilic in nature, and the other block consists of a poly(alkylene oxide) chain that is hydrophobic in nature. For a three-block copolymer, two of the blocks consist of a poly(alkylene oxide) chain that is hydrophilic in nature, while the other block, located between the two blocks with hydrophilic parts, consists of a poly(alkylene oxide) chain that is hydrophobic in nature. In the case of a three-block copolymer, the poly(alkylene oxide) chains that are hydrophilic in nature are preferably poly(ethylene oxide) chains that are denoted as $(PEO)_x$ and $(PEO)_z$, and the poly(alkylene oxide) chains that are hydrophobic in nature are poly(propylene oxide) chains that are denoted as $(PPO)_y$, poly(butylenes oxide) chains or mixed chains of which each chain is a mixture of several alkylene oxide monomers. Very preferably, in the case of a three-block copolymer, a compound of formula $(PEO)_x$-$(PPO)_y$-$(PEO)_z$, where x is between 5 and 300, y is between 33 and 300, and z is between 5 and 300, is used. The values of x and z are preferably identical. Very advantageously, a compound in which x=20, y=70 and z=20 (poly(ethylene oxide)$_{20}$-poly(propylene oxide)$_{70}$-poly(ethylene oxide)$_{20}$ or else called P123), and a compound in which x=106, y=70, and z=106 (F127) are used. The commercial non-ionic surfactants that are known under the name of Pluronic (BASF), Tetronic (BASF), Triton (Sigma), Tergitol (Union Carbide), and Brij (Aldrich) can be used as non-ionic surfactants in stage a) of the principal process for preparation according to the invention. For a four-block copolymer, two of the blocks consist of a poly(alkylene oxide) chain that is hydrophilic in nature and the two other blocks consist of a poly(alkylene oxide) chain that is hydrophobic in nature.

The stage for spraying the mixture according to stage b) of the principal process for preparation according to the invention produces spherical droplets with a diameter of less than or equal to 200 µm and preferably in a range of between 50 nm and 20 µm. The size distribution of these droplets is lognormal. The aerosol generator that is used here is a model 3078 commercial device provided by TSI. The spraying of the solution is done in a room in which a carrier gas, an $O_2/N_2$ (dry air) mixture, is sent under a pressure P that is equal to 1.5 bar. According to stage c) of the principal process for preparation according to the invention, drying of said droplets is initiated. This drying is carried out by the transport of said droplets via the carrier gas, the $O_2/N_2$ mixture, in glass tubes, which leads to the gradual evaporation of the solution, for example the acidic aqueous organic solution as specified in this specification below and thus to obtaining spherical elementary particles. This drying is ideal via a passage of said particles into a furnace whose temperature can be adjusted, the usual temperature range varying from 50 to 600° C. and preferably from 80 to 400° C., whereby the dwell time of these particles in the furnace is on the order of one second. The particles are then collected in a filter and constitute the mesostructured material according to the invention. A pump that is placed at the circuit end promotes the routing of the residues into the aerosol experimental device. The drying of the droplets according to stage c) of the principal process for preparation according to the invention is advantageously followed by a passage in the oven at a temperature of between 50 and 150° C. The elimination of the surfactant during stage d) of the principal process for preparation according to the invention so as to obtain the material according to the invention is advantageously carried out by chemical extraction processes or by heat treatment and preferably by calcination in air in a temperature range of 300 to 1000° C. and more specifically in a range of 500 to 600° C. for a period of 1 to 24 hours and preferably for a period of 2 to 6 hours.

This invention also proposes providing two alternating processes for preparation of a mesostructured/zeolitic mixed material according to the invention, i.e., a material in which each of the spherical particles that constitutes it comprises a mesostructured matrix, entirely aluminum, or aluminosilicate in nature, and zeolitic nanocrystals that have a pore size of between 0.2 and 2 nm.

A first embodiment of the process for the preparation of the material that has zeolitic nanocrystals trapped in the mesostructured oxide matrix according to the invention, called "first process for the preparation of the mesostructured/zeolitic mixed material according to the invention" below, comprises the same stages a), b), c) and d) of the principal process for preparation according to the invention, described above for the preparation of a mesostructured material that has an entirely aluminum mesostructured matrix or a matrix that is aluminosilicate in nature. Said first process for the preparation of the mesostructured/zeolitic mixed material according to the invention also comprises a prior stage $a_o$) that consists in the synthesis, in the presence of a structuring agent, of zeolitic nanocrystals of a maximum nanometric size that is equal to 300 nm so as to obtain a colloidal solution within which are dispersed said nanocrystals. Said colloidal solution that is obtained according to $a_o$) is introduced into the mixture according to stage a) of the principal preparation process according to the invention. Said first process for the preparation of the mesostructured/zeolitic mixed material according to the invention therefore comprises: $a_o$) the synthesis, in the presence of at least one structuring agent, of zeolitic nanocrystals of a maximum nanometric size that is equal to 300 nm so as to obtain a colloidal solution in which are dispersed said nanocrystals; a') the mixing in solution of at least one surfactant, at least one aluminum precursor, and optionally at least one silica precursor, and at least one colloidal solution that is obtained according to $a_o$); b') the aerosol spraying of the solution that is obtained in stage a') to lead to the formation of spherical droplets with a diameter that is less than or equal to 200 µm; c') the drying of said droplets, and d') the elimination of said surfactant and said structuring agent for obtaining a mesostructured/zeolitic mixed material.

According to stage $a_o$) of the first process for the preparation of the mesostructured/zeolitic mixed material according to the invention, the zeolitic nanocrystals are synthesized according to the operating procedures that are known to one skilled in the art. In particular, the synthesis of beta zeolite nanocrystals was described by T. Bein et al., *Micropor. Mesopor. Mater.*, 2003, 64, 165. The synthesis of Y zeolite nanocrystals was described by T. J. Pinnavaia et al., *J. Am. Chem. Soc.*, 2000, 122, 8791. The synthesis of faujasite zeolite nanocrystals was described in Kloetstra et al., *Microporous Mater.*, 1996, 6, 287. The synthesis of ZSM-5 zeolite nanocrystals was described in several publications: R. de Ruiter et al., *Synthesis of Microporous Materials*, Vol. I; M. L. Occelli, H. E. Robson (eds.), Van Nostrand Reinhold, New York, 1992, 167; A. E. Persson, B. J. Schoeman, J. Sterte, J.-E. Otterstedt, *Zeolites*, 1995, 15, 611-619. Generally, zeolitic nanocrystals are synthesized by preparing a reaction mixture that contains at least one silica source, optionally at least one source of at least one T element that is selected from among aluminum, iron, boron, indium and gallium, preferably at least one aluminum source, and at least one structuring agent. The reaction mixture is either aqueous or aqueous organic, for example a water-alcohol mixture. The reaction mixture is advantageously put under hydrothermal conditions under an autogenous pressure, optionally by adding gas, for example nitrogen, at a temperature of between 50 and 200° C., preferably between 60 and 170° C., and even more preferably at a temperature that does not exceed 120° C. until the formation of zeolitic nanocrystals. At the end of said hydrothermal treatment, a colloidal solution in which the nanocrystals are found in the dispersed state is obtained. The structuring agent can be ionic or neutral according to the zeolite that is to be synthesized. It is common to use the structuring agents of the following non-exhaustive list: nitrogen-containing organic cations, elements of the family of alkalines (Cs, K, Na, etc.), ether rings, diamines as well as any other structuring agent that is well known to one skilled in the art.

In a second embodiment of the process for the preparation of mesostructured/zeolitic mixed material according to the invention, called "second process for the preparation of mesostructured/zeolitic mixed material according to the invention" below, zeolitic crystals that have the characteristic of dispersing in the form of nanocrystals of a maximum nanometric size that is equal to 300 nm in solution, for example in acidic aqueous organic solution, are used initially. Said zeolitic crystals are introduced into the mixture according to stage a) of the principal process for preparation according to the invention described above for the preparation of a mesostructured material that has an entirely aluminum mesostructured matrix or a matrix that is aluminosilicate in nature. Said second process for the preparation of the mesostructured/zeolitic mixed material according to the invention comprises a") the mixing in solution of at least one surfactant, at least one aluminum precursor, optionally at least one silica precursor, and zeolitic crystals that disperse in the form of nanocrystals of a maximum nanometric size that is equal to 300 nm in said solution; b") the aerosol spraying of said solution that is obtained in stage a") for leading to the formation of spherical droplets of a diameter that is less than or equal to 200 µm; c") the drying of said droplets, and d") the elimination of at least said surfactant for obtaining a mesostructured/zeolitic mixed material.

In stage a") of the second process for the preparation of the mesostructured/zeolitic mixed material according to the invention, zeolitic crystals are used. Any crystallized zeolite, known in the prior art, which has the property of dispersing in solution, for example in acidic aqueous organic solution, in the form of nanocrystals of a maximum nanometric size that is equal to 300 nm, is suitable for the implementation of stage a"). Said zeolitic crystals are synthesized by methods that are known to one skilled in the art. The zeolitic crystals that are used in stage a") may already be in the form of nanocrystals. Zeolitic crystals of a size larger than 300 nm, for example between 300 nm and 200 µm, and that disperse in solution, for example in aqueous organic solution, preferably in acidic aqueous organic solution, are also advantageously used in the form of nanocrystals of a maximum nanometric size that is equal to 300 nm. Obtaining zeolitic crystals that disperse in the form of nanocrystals of a maximum nanometric size that is equal to 300 nm is also possible by carrying out a functionalization of the surface of the nanocrystals. The zeolitic crystals that are used are found either in their crude synthesis form, i.e., also containing the structuring agent, or in their calcined form, i.e., the form from which said structuring agent is removed. When the zeolitic crystals that are used are in their crude synthesis form, said structuring agent is eliminated during stage d") of the second process for the preparation of the mesostructured/zeolitic mixed material according to the invention.

According to the two processes for preparation of the mesostructured/zeolitic mixed material according to the invention, the aluminum precursor and optionally the silica precursor, used in stage a') of the first process for the preparation of the mesostructured/zeolitic mixed material according to the invention, respectively in stage a") of the second process for the preparation of the mesostructured/zeolitic mixed material according to the invention, are those already given above in the description of the principal preparation process according to the invention for the preparation of a mesostructured material that has an entirely aluminum mesostructured matrix or a matrix that is aluminosilicate in nature. The same is true for the surfactant that is used in stage a') of the first process for the preparation of the mesostructured/zeolitic mixed material according to the invention, respectively in stage a") of the second process for the preparation of the mesostructured/zeolitic mixed material according to the invention. It can be an ionic or non-ionic surfactant. A surfactant that comes in the form of a block copolymer that consists of poly(alkylene oxide) chains is particularly preferred. A specific description of this surfactant form is given above for the preparation of a mesostructured material that has an entirely aluminum mesostructured matrix or a matrix that is aluminosilicate in nature (stage a) of the principal process for preparation according to the invention.

The solution in which all of the reagents according to stage a) of the principal process for preparation according to the invention or according to stage a') of the first process for the preparation of the mesostructured/zeolitic mixed material according to the invention or else according to stage a") of the second process for the preparation of the mesostructured/zeolitic mixed material according to the invention are mixed can be acidic, neutral or basic. Said solution is preferably acidic and has a maximum pH that is equal to 3, preferably between 0 and 2. The acids that are used to obtain an acidic solution with a maximum pH that is equal to 3 are, in a non-exhaustive way, hydrochloric acid, sulfuric acid and nitric acid. Said solution can be aqueous or can be a water-organic solvent mixture, whereby the organic solvent is preferably a water-miscible polar solvent, in particular THF or an alcohol, in this latter case preferably ethanol. Said solution can also be virtually organic, preferably virtually alcoholic, whereby the amount of water is such that the hydrolysis of the inorganic precursors is ensured (stoichiometric amount). Very preferably, said solution—into which are mixed at least one aluminum precursor, at least one surfactant, and optionally at least one silica precursor—is an acidic aqueous organic mixture, very preferably an acid water-alcohol mixture.

In the preferred case where the matrix of the material according to the invention contains silicon oxide in addition to the aluminum oxide, the concentrations of silica and aluminum precursors in stage a) of the principal process for preparation according to the invention or in stages a') and a") of the first and second processes for the preparation of the mesostructured/zeolitic mixed material according to the invention are defined by the Si/Al molar ratio, whereby the latter is strictly less than 1. For the preparation of a mesostructured/zeolitic mixed material according to the invention, the amount of zeolitic nanocrystals dispersed in the colloidal solution introduced during stage a') of the first process for the preparation of the mesostructured/zeolitic mixed material according to the invention, respectively that of the zeolitic crystals that are introduced during stage a") of the second process for the preparation of the mesostructured/zeolitic mixed material according to the invention, is such that the zeolitic nanocrystals advantageously represent from 0.1 to 30% by weight, preferably from 0.1 to 20% by weight, and very preferably from 0.1 to 10% by weight of the mesostructured/zeolitic mixed material of the invention. The initial concentration of surfactant introduced into the mixture according to stage a) of the principal process for preparation according to the invention or according to stage a') of the first process for the preparation of the mesostructured/zeolitic mixed material according to the invention or else according to stage a") of the second process for the preparation of the mesostructured/zeolitic mixed material according to the invention is defined by $c_o$, and $c_o$ is defined relative to the critical micellar concentration ($c_{mc}$) that is well known to one skilled in the art. The $c_{mc}$ is the maximum concentration beyond which the self-arrangement phenomenon of the surfactant molecules occurs in the solution. The concentration $c_o$ can be less than, equal to or greater than the $c_{mc}$; it is preferably less than the $c_{mc}$. In a preferred implementation of each of the three processes according to the invention (principal process for preparation according to the invention, first process for the preparation of the mesostructured/zeolitic mixed material according to the invention and second process for the preparation of the mesostructured/zeolitic mixed material according to the invention), the concentration $c_o$ is less than the $c_{mc}$, and said targeted solution at each of stages a), a') and a") of each of the three process for preparation according to the invention is an acid water-alcohol mixture.

In the case where the targeted solution at each of stages a), a') and a") of each of the three processes for preparation according to the invention is a water-organic solvent mixture, preferably acidic, it is preferred during each of said stages a), a') and a" of each of the three processes for preparation according to the invention that the surfactant concentration at the origin of the mesostructuring of the matrix be less than the critical micellar concentration such that the evaporation of said aqueous organic solution, preferably acidic, during each of stages b), b') and b") of each of the three processes for preparation according to the invention by the aerosol technique induces a phenomenon of micellization or self-assembly leading to the mesostructuring of the matrix of the material according to the invention. In the case of the preparation of a mesostructured/zeolitic mixed material, the mesostructuring of the matrix of the material occurs around zeolitic nanocrystals that remain unchanged in their shape and their size during stages b') and c') of the first process for the preparation of the mesostructured/zeolitic mixed material according to the invention, or of stages b") and c") of the second process for the preparation of the mesostructured/zeolitic mixed material according to the invention. When $c_o<c_{mc}$, the mesostructuring of the matrix of the material according to the invention, prepared according to one of the three processes of the invention, is consecutive to a progressive concentration, within each droplet, of the aluminum precursor, the surfactant, and optionally the silica precursor up to a surfactant concentration $c>c_{mc}$ that results from an evaporation of the aqueous organic solution, preferably acidic.

In general, the increase of the combined concentration of the aluminum precursor and optionally the silica precursor and of the surfactant causes the precipitation of the aluminum precursor and optionally the silica precursor, hydrolyzed, around the self-organized surfactant and consequently the structuring of the material according to the invention. By a cooperative self-assembly mechanism, the inorganic/inorganic phase, organic/organic phase and organic/inorganic phase interactions lead to the condensation of the hydrolyzed aluminum precipitate and optionally the hydrolyzed silica precursor around the self-organized surfactant. In the case of the preparation of a mesostructured/zeolitic mixed material, the zeolitic nanocrystals are trapped, during said self-assembly phenomenon, in the matrix that is based on aluminum oxide, mesostructured, included in each of the elementary spherical particles that constitute the material of the invention. The aerosol technique is particularly advantageous for the implementation of each of stages b), b') and b") of each of the three processes according to the invention so as to force the reagents that are present in the initial solution to interact with one another, no loss of material save the solvents being possible, all of the aluminum elements, optionally silicon and optionally the zeolitic nanocrystals, initially present, thus being perfectly preserved during each of the three processes according to the invention instead of being eliminated throughout the stages of filtration and washing encountered in standard synthesis processes known to one skilled in the art.

Stages b'), c') and d'), or b"), c") and d") according to the first process for the preparation of the mesostructured/zeolitic mixed material according to the invention or according to the second process for the preparation of the mesostructured/zeolitic mixed material are carried out under the same operating conditions as those in which stages b), c) and d) of the principal process according to the invention are carried out.

The mesostructured material of the invention, optionally having nanocrystals of zeolites trapped within the mesostructured matrix, is characterized by several analytical techniques and in particular by low-angle x-ray diffraction (low-angle DRX), by high-angle x-ray diffraction (high-angle DRX), by volumetric analysis with nitrogen (BET), by transmission electron microscopy (TEM), by scanning electronic microscopy (SEM) and by plasma emission spectrometry induced by high frequency (ICP).

The low-angle x-ray diffraction technique (values of the angle 2θ between 0.5 and 6°) makes it possible to characterize the periodicity on the nanometric scale generated by the organized mesoporosity of the mesostructured matrix of the material of the invention. In the following specification, the x-ray analysis is carried out on powder with a diffractometer that operates by reflection and is equipped with a rear monochromatic illuminator by using the radiation of the copper (wavelength of 1.5406 Å). The peaks that are usually observed on the diffractograms that correspond to a given value of the angle 2θ are associated with inter-reticular distances $d_{(hkl)}$ that are characteristic of the structural symmetry of the material (hkl) being the Miller indices of the reciprocal network) by Bragg's equation: $2d_{(hkl)}*\sin(\theta)=\eta*\lambda$. This indexing then makes possible the determination of the mesh parameters (abc) of the direct network, whereby the value of these parameters is based on the hexagonal, cubic, cholesteric, lamellar, bicontinuous or vermicular structure that is obtained. For example, the low-angle x-ray diffractogram of a mesostructured material that consists of elementary spherical particles comprising an aluminosilicate matrix and obtained according to the principal process for preparation according to the invention via the use of the particular block copolymer referred to as poly(ethylene oxide)$_{20}$-poly(propylene oxide)$_{70}$-poly(ethylene oxide)$_{20}$ (PEO$_{20}$-PPO$_{70}$-PEO$_{20}$ or Pluronic 123) has a perfectly resolved correlation peak corresponding to the correlation distance between pores d that is characteristic of a vermicular-type structure and defined by Bragg's equation $2d*\sin(\theta)=\eta*\lambda$.

The technique of high-angle x-ray diffraction (values of the angle 2θ of between 5 and 100°) makes it possible to characterize a crystallized solid that is defined by the repetition of a unitary pattern or elementary mesh on the molecular scale. It follows the same physical principle as the one controlling the low-angle x-ray diffraction technique. The high-angle DRX technique is therefore used to analyze the mesostructured/zeolitic mixed materials because it is quite particularly suited to the structural characterization of the zeolitic nanocrystals that are present in each of the elementary spherical particles that constitute the mesostructured/zeolitic mixed material according to the invention. In particular, it makes it possible to access the size of the pores of the zeolitic nanocrystals. For example, the high- and low-angle x-ray diffractograms of a mesostructured/zeolitic mixed material that is obtained according to the first or the second process for the preparation of a mesostructured/zeolitic mixed material according to the invention comprising ZSM-5 (MFI)-type zeolite nanocrystals, whereby the mesostructured matrix is aluminosilicate in nature and is obtained via the use of the particular block copolymer that is referred to as poly(ethylene oxide)$_{106}$-poly(propylene oxide)$_{70}$-poly(ethylene oxide)$_{106}$ (PEO$_{106}$-PPO$_{70}$-PEO$_{106}$ or F127), respectively have the diffractogram associated with the symmetry group Pnma (No. 62) of the high-angle ZSM-5 zeolite and a perfectly resolved small-angle correlation peak associated with the vermicular-type structure of the mesostructured matrix that correspond to a distance d for correlation between pores. The value of the angle that is obtained on the RX diffractogram makes it possible to return to the correlation distance d according to Bragg's law: $2d*\sin(\theta)=\eta*\lambda$. The mesh parameter values a, b, c that are obtained for the characterization of the zeolite nanocrystals are consistent with the values that are obtained for a ZSM-5 (MFI)-type zeolite that are well known to one skilled in the art ("Collection of Simulated XRD Powder Patterns for Zeolites," 4$^{th}$ Revised Edition, 2001, M. M. J. Treacy, J. B. Higgins).

The volumetric analysis with nitrogen corresponding to the physical adsorption of nitrogen molecules in the pores of the material via a gradual increase of pressure at a constant temperature provides information on the particular textural characteristics (pore diameter, type of pore, specific surface area) of the material according to the invention. In particular, it makes it possible to access the specific surface area and the mesopore distribution of the material. Specific surface area is defined as the B.E.T. specific surface area ($S_{BET}$ in m$^2$/g) determined by adsorption of nitrogen according to the ASTM D 3663-78 standard established from the BRUNAUER-EMMETT-TELLER method described in the periodical "The Journal of American Society," 60, 309, (1938). The pore distribution that is representative of a mesopore population centered in a range of 1.5 to 50 nm is determined by the Barrett-Joyner-Halenda (BJH) model. The adsorption-desorption isotherm of nitrogen according to the BJH model that is thus obtained is described in the periodical "The Journal of American Society," 73, 373 (1951) written by E. P. Barrett, L. G. Joyner and P. P. Halenda. In the following specification, the diameter of the mesopores φ of the given mesostructured matrix corresponds to the mean diameter with the nitrogen adsorption defined as being a diameter such that all of the pores that are less than this diameter constitute 50% of the pore volume (Vp) measured on the adsorption branch of the nitrogen isotherm. In addition, the form of the nitrogen adsorption isotherm and the hysteresis loop can provide information on the nature of the mesoporosity and on the possible presence of microporosity essentially linked to the zeolitic nanocrystals when they are present in the mesostructured oxide matrix. For example, the nitrogen adsorption isotherm relative to a mesostructured aluminosilicate material according to the invention and obtained thanks to the principal process for preparation according to the invention by using as surfactant the particular block copolymer, referred to as poly(ethylene oxide)$_{20}$-poly(propylene oxide)$_{70}$-poly(ethylene oxide)$_{20}$ (PEO$_{20}$-PPO$_{70}$-PEO$_{20}$ or Pluronic 123 or P123), is characterized by an adsorption isotherm of class IV and an H1-type hysteresis loop, the curve of the associated pore distribution being representative of a population of mesopores of a uniform size centered in a range of 4 to 10 nm. For an example of a mesostructured/zeolitic mixed material, the nitrogen adsorption isotherm of such a material that is obtained according to the first or the second of the processes for the preparation of a mesostructured/zeolitic mixed material according to the invention and comprising ZSM-5 (MFI)-type zeolite nanocrystals, whereby the mesostructured matrix is aluminosilicate in nature and is obtained via the use of the particular block copolymer that is referred to as poly(ethylene oxide)$_{106}$-poly(propylene oxide)$_{70}$-poly(ethylene oxide)$_{106}$ (PEO$_{106}$-PPO$_{70}$-PEO$_{106}$ or F127), presents for low P/PO values (where PO is the saturating vapor pressure at the temperature T) a type I-isotherm that is characteristic of a microporous material and for the higher P/PO values an IV-type isotherm as well as an H1-type hysteresis loop, whereby the associated pore distribution curve is representative of a population of mesopores of uniform size centered in a range of 4 to 10 nm.

Concerning the mesostructured matrix, the difference between the value of the diameter of the pores φ and the mesh parameter a defined by low-angle DRX as described above makes it possible to access the magnitude e where e=a−φ, and is characteristic of the thickness of the amorphous walls of the mesostructured matrix, each constituting spherical particles of the material according to the invention. Said mesh parameter a is connected at distance d for correlation between pores by a geometric factor that is characteristic of the geometry of the phase. For example, in the case of a hexagonal mesh, e=a−φ with a=2*d/√3, and in the case of a vermicular structure, e=d−φ.

The analysis by transmission electron microscopy (TEM) is a technique that is also extensively used to characterize the structure of these materials. The latter makes possible the formation of an image of the solid being studied, whereby the observed contrasts are characteristic of the structural organization, the texture or else the morphology of the observed particles, the resolution of the technique reaching at most 0.2 nm. In the following specification, the TEM photos will be executed from microtome sections of the sample so as to visualize a section of an elementary spherical particle of the material according to the invention. For example, the TEM images that are obtained for a mesostructured aluminosilicate material according to the invention and obtained using the principal preparation process according to the invention by using the particular block copolymer that is referred to as Pluronic 123 have spherical elementary particles that have a vermicular mesostructure, whereby the material is defined by the dark zones. The analysis of the image also makes it possible to access the parameters d, φ, and e that are characteristic of the mesostructured matrix defined above. For an example of a mesostructured/zeolitic mixed material, the TEM images that are obtained for such a material obtained according to the first or the second of the processes for the preparation of a mesostructured/zeolitic mixed material according to the invention comprising ZSM-5 (MFI)-type zeolite nanocrystals, whereby the mesostructured matrix is aluminosilicate in nature and is obtained via the use of the particular block copolymer that is referred to as P123, have, within the same spherical particle, a vermicular mesostructure (whereby the material is defined by dark zones) within which are visualized more or less spherical opaque objects that represent the zeolitic nanocrystals that are trapped in the mesostructured matrix. The analysis of the image also makes it possible to access parameters d, φ, and e, characteristic of the mesostructured matrix defined above. It is possible to visualize, also in this same block, the reticular planes of the nanocrystals instead of the opaque objects cited above and thus to return to the structure of the zeolite.

The morphology and the size distribution of the elementary particles have been established by analysis of photos obtained by scanning electronic microscopy (SEM).

The structure of the mesostructured matrix that constitutes each of the particles of the material according to the invention can be cubic, vermicular, cholesteric, lamellar, bicontinous or hexagonal based on the nature of the surfactant that is selected as a structuring agent. It is preferably a vermicular structure.

This invention relates to the use of the mesostructured material according to the invention as an adsorbent for monitoring pollution or as a molecular sieve for the separation. This invention therefore also has as its object an adsorbent that comprises the mesostructured material according to the invention. It is also advantageously used as an acidic solid for catalyzing reactions, for example those that take place in the fields of refining and petrochemistry.

When the mesostructured material according to the invention is used as a catalyst, this material can be combined with an inorganic matrix that can be inert or catalytically active and with a metal phase. The inorganic matrix can be present simply as a binder for keeping together the particles of said material under the different known forms of the catalysts (extrudates, pellets, balls, powders) or else can be added as a diluent to impose the degree of conversion in a process that otherwise would progress at too fast a pace, leading to a crushing of the catalyst as a consequence of a significant coke formation. Typical inorganic matrices are in particular substrate materials for the catalysts such as the various forms of silica, alumina, silica-alumina, magnesia, zirconia, titanium and boron oxides, phosphates of aluminum, titanium and zirconium, clays such as kaolin, bentonite, montmorillonite, sepiolite, attapulgite, fuller's earth, synthetic porous materials such as $SiO_2$—$Al_2O_3$, $SiO_2$—$ZrO_2$, $SiO_2$—$ThO_2$, $SiO_2$—$BeO$, $SiO_2$—$TiO_2$ or any combination of these compounds. The inorganic matrix can be a mixture of various compounds, in particular an inert phase and an active phase. Said material of this invention can also be combined with at least one zeolite and can play the role of principal active phase or additive. The metal phase can be introduced integrally in said material of the invention. It can also be introduced integrally on the inorganic matrix or else on the inorganic matrix-mesostructured solid unit by ion exchange or impregnation with cations or oxides that are selected from among the following elements: Cu, Ag, Ga, Mg, Ca, Sr, Zn, Cd, B, Al, Sn, Pb, V, P, Sb, Cr, Mo, W, Mn, Re, Fe, Co, Ni, Pt, Pd, Ru, Rh, Os, Ir and any other element of the periodic table.

The catalytic compositions that comprise the material of this invention are suitable in a general way for the implementation of the principal processes for transformation of hydrocarbons and synthesis reactions of organic compounds.

The catalytic compositions that comprise the material of the invention advantageously find their application in the reactions of isomerization, transalkylation and dismutation, alkylation and dealkylation, hydration and dehydration, oligomerization and polymerization, cyclization, aromatization, cracking, reforming, hydrogenation and dehydrogenation, oxidation, halogenation, hydrocracking, hydroconversion, hydrotreatment, hydrodesulfurization and hydrodenitrating, and catalytic elimination of nitrogen oxides, whereby said reactions involve feedstocks that comprise saturated and unsaturated aliphatic hydrocarbons, aromatic hydrocarbons, oxygenated organic compounds and organic compounds that contain nitrogen and/or sulfur as well as organic compounds that contain other functional groups.

The invention is illustrated by means of the following examples.

EXAMPLE 1 (INVENTION)

Preparation of a Mesostructured Aluminosilicate Material with a High Aluminum Content of an Si/Al Molar Ratio=0.5

Figure 1:
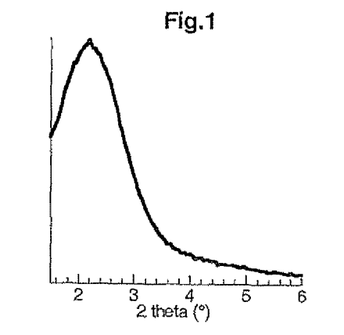
FIGS. 1-7 are graphic representations of various characterizing properties of the solids of the invention.
Figure 2:
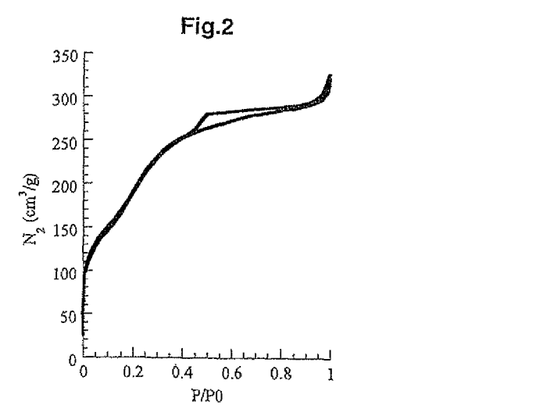
Figure 3:
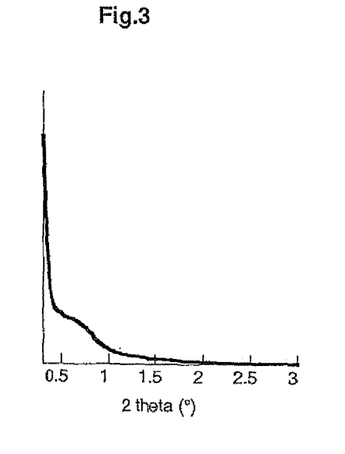

3.38 g of aluminum trichloride is added to a solution that contains 30 g of ethanol, 13.6 ml of water, 0.036 ml of HCl and 1.4 g of CTAB surfactant. The overall structure is stirred at ambient temperature until the aluminum precursor dissolves completely. 1.45 g of tetraethyl orthosilicate (TEOS) is then treated. After stirring for 10 minutes at ambient temperature, the overall structure is sent into the spraying chamber of the aerosol generator, and the solution is sprayed in the form of fine droplets under the action of the carrier gas (dry air) that is introduced under pressure (P=1.5 bar) as it was described in the description above. The droplets are dried according to the operating procedure described in the specification of the invention above. The temperature of the drying furnace is set at 350° C. The collected powder is then calcined in air for 5 hours at T 550° C. The solid is characterized by low-angle DRX (FIG. 1), by volumetric analysis with nitrogen (FIG. 2, the PO magnitude indicated on the abscissa is the saturating vapor pressure), by TEM (FIG. 3), by SEM and by ICP. The TEM analysis shows that the final material has an organized mesoporosity that is characterized by a vermicular structure. The analysis by volumetric analysis with nitrogen leads to a specific surface area of the final material of $S_{BET}$=780 m²/g and to a mesoporous diameter of $\phi$=2.5 nm. The small-angle DRX analysis leads to the visualization of a peak with correlation to the angle 2θ=2.2. Bragg's equation d*sin(1.1)=1.5406 makes it possible to calculate the distance d for correlation between the pores of the mesostructured matrix, or d=4.0 nm. The thickness of the walls of the mesostructured matrix that is defined by e=d−$\phi$ is therefore e=1.5 nm. The ICP analysis provides an Si/Al molar ratio that is equal to 0.5. A SEM block of the spherical elementary particles thus obtained indicates that these particles have a size that is characterized by a diameter that varies from 50 to 700 nm, whereby the size distribution of these particles is centered around 300 nm.

EXAMPLE 2 (INVENTION)

Preparation of a Mesostructured Aluminosilicate Material with a High Aluminum Content of an Si/Al Molar Ratio=0.9

Figure 4:
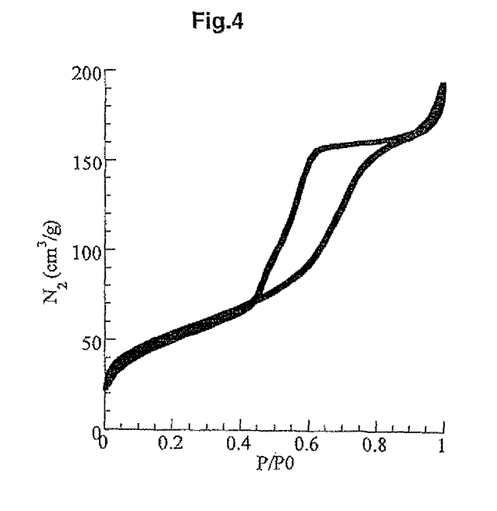
Figure 5:
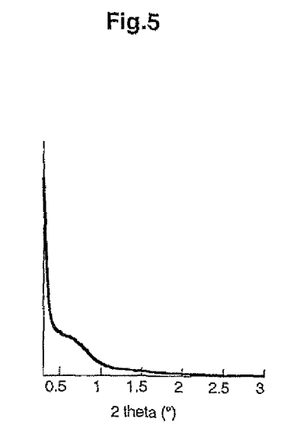
Figure 6:
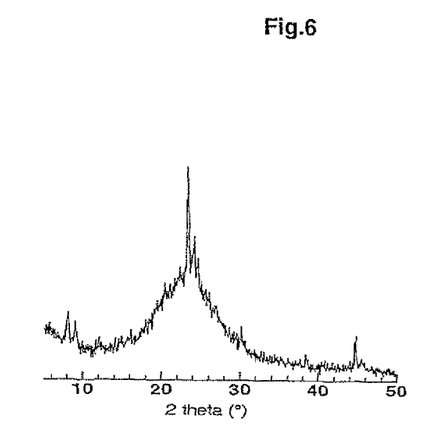

2.65 g of aluminum trichloride is added to a solution that contains 30 g of ethanol, 13.8 ml of water, 0.036 ml of HCl, and 1.4 g of surfactant P123. The overall structure is stirred at ambient temperature until the aluminum precursor dissolves completely. 2 g of tetraethyl orthosilicate (TEOS) is then treated. After stirring for 18 hours at ambient temperature, the overall structure is sent into the spraying chamber of the aerosol generator, and the solution is sprayed in the form of fine droplets under the action of the carrier gas (dry air) that is introduced under pressure (P=1.5 bar). The droplets are dried according to the operating procedure described in the specification of the invention above. The temperature of the drying furnace is set at 350° C. The collected powder is then calcined in air for 5 hours at T=550° C. The solid is characterized by low-angle DRX (FIG. 4), by volumetric analysis with nitrogen (FIG. 5, the PO magnitude indicated on the abscissa is the saturating vapor pressure), by TEM (FIG. 6), by SEM and by ICP. The TEM analysis shows that the final material has an organized mesoporosity that is characterized by a vermicular structure. The analysis by volumetric analysis with nitrogen leads to a specific surface area of the final material of $S_{BET}$=180 m²/g and to a mesoporous diameter of 5.6 nm. The small-angle DRX analysis leads to the visualization of a peak with correlation to the angle 2θ=0.64. Bragg's equation 2d*sin(0.32)=1.5406 makes it possible to calculate the distance d for correlation between the pores of the mesostructured matrix, or d=13.1 nm. The thickness of the walls of the mesostructured matrix that is defined by e=d−$\phi$ is therefore e=7.5 nm. The ICP analysis provides an Si/Al molar ratio that is equal to 0.9. An SEM block of the spherical elementary particles thus obtained indicates that these particles have a size that is characterized by a diameter that varies from 50 to 700 nm, whereby the size distribution of these particles is centered around 300 nm.

EXAMPLE 3 (INVENTION)

Preparation of a Mesostructured Aluminosilicate Material with a High Aluminum Content Comprising ZSM-5 (MFI)-Type Zeolite Nanocrystals (Molar Si/Al=100, 10% by Weight of the Final Material) Trapped in a Mesostructured Aluminosilicate Matrix (Molar Si/Al=0.9)

Figure 7:
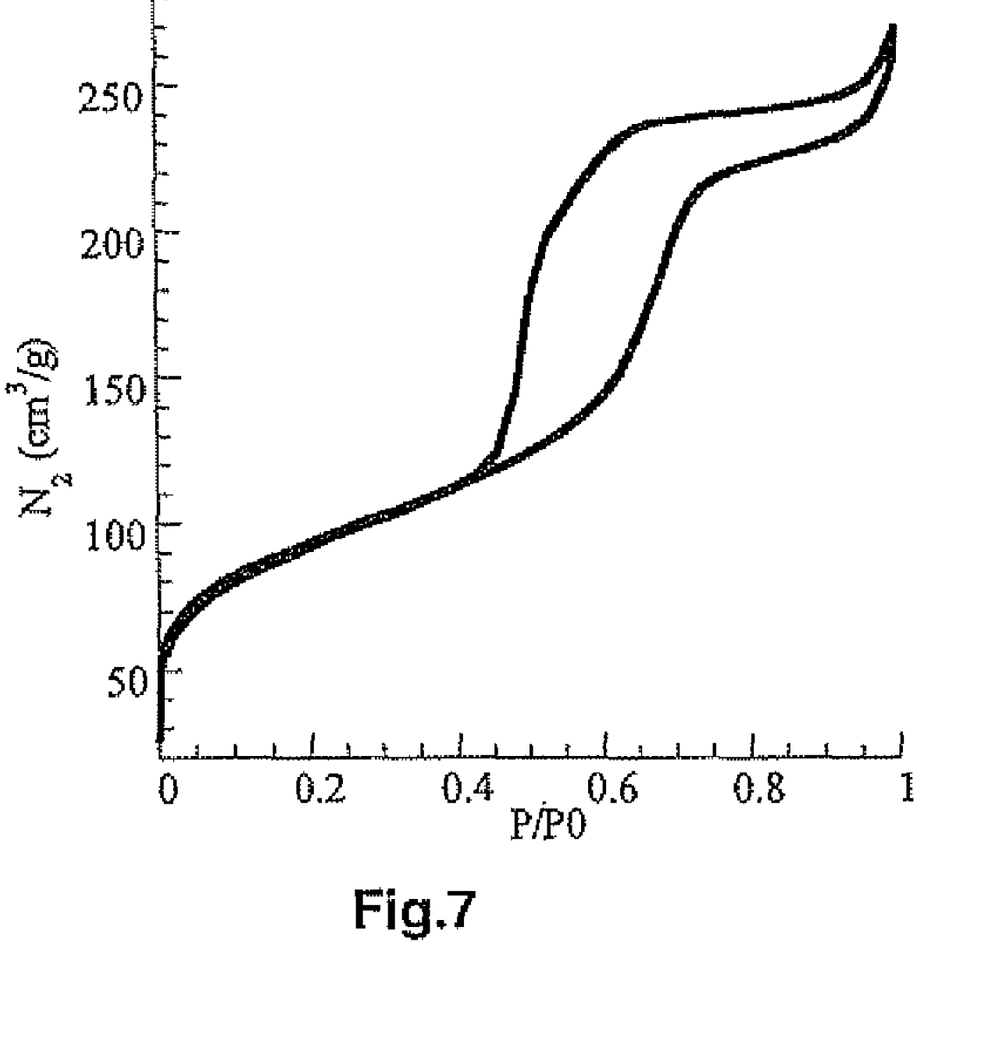

0.14 g of tri-sec-aluminum butoxide is added to a solution that contains 3.5 ml of tetrapropyl ammonium hydroxide (TPAOH), 0.01 g of NaOH soda, and 4.3 ml of water. After aluminum alkoxide is dissolved, 6 g of tetraethylorthosilicate (TEOS) is added. The solution is stirred at ambient temperature for 5 hours then is autoclaved at T=95° C. for 12 hours. The white solution that is obtained contains 135 nm ZSM-5 nanocrystals. This solution is centrifuged at 20,000 rpm for 30 minutes. The solid is redispersed in the water and then centrifuged again at 20,000 rpm for 30 minutes. This washing is carried out twice. The nanocrystals form a gel that is dried in the oven for one night at 60° C. 0.461 mg of these crystals is redispersed in a solution that contains 30 g of ethanol, 13.8 ml of water, 2 g of TEOS, 2.65 g of AlCl₃, 6H₂O, 0.036 ml of HCl and 1.4 g of P123 surfactant by ultrasonic stirring for 24 hours. The overall structure is sent into the spraying chamber of the aerosol generator, and the solution is sprayed in the form of fine droplets under the action of the carrier gas (dry air) that is introduced under pressure (P=1.5 bar) according to the method that is described in the specification of the invention above. The droplets are dried according to the operating procedure that is described in the specification of the invention above. The temperature of the drying furnace is set at 350° C. The collected powder is then calcined in air for 5 hours at T=550° C. The solid is characterized by low-angle DRX (FIG. 7) and high-angle DRX, by volumetric analysis with nitrogen, by TEM, by SEM and by ICP. The TEM analysis shows that the final material consists of ZSM-5 zeolite nanocrystals that are trapped in an aluminosilicate matrix with organized mesoporosity characterized by a vermicular structure. The analysis by volumetric analysis with nitrogen leads to a specific surface area of the final material of $S_{BET}$=310 m²/g and to a mesoporous diameter that is characteristic of the aluminosilicate mesostructured matrix of φ=5.6 nm. The high-angle DRX analysis leads to obtaining the diffractogram that is characteristic of the ZSM-5 zeolite (size of the micropores on the order of 0.55 nm). The small-angle DRX analysis leads to the visualization of a correlation peak associated with the vermicular symmetry of the mesostructured matrix. Bragg's equation provides 2d*sin(0.32)= 1.5406, or d=13.1 nm. The thickness of the amorphous walls of the aluminosilicate mesostructured matrix that is defined by e=d−φ is therefore e=7.5 nm. The ICP analysis provides an Si/Al molar ratio of the matrix that is equal to 0.9. A SEM block of the spherical elementary particles thus obtained indicates that these particles have a size that is characterized by a diameter that varies from 50 to 700 nm, whereby the size distribution of these particles is centered around 300 nm.

The invention claimed is:

1. Mesostructured material that consists of at least two elementary spherical particles, whereby each of said particles comprises zeolitic nanocrystals having a pore size of between 0.2 and 2 nm, and a mesostructured matrix that is based on aluminum oxide and has a pore size of between 1.5 and 30 nm and an aluminum oxide content that represents more than 46% by weight relative to the mass of said matrix, which has amorphous walls of a thickness of between 1 and 30 nm, whereby said elementary spherical particles have a maximum diameter of 10 μm.

2. Material according to claim 1, such that said mesostructured matrix that is based on aluminum oxide comprises silicon oxide.

3. Material according to claim 2, such that said mesostructured matrix has an Si/Al molar ratio that is strictly less than 1.

4. Material according to claim 1, such that said mesostructured matrix has a cubic, vermicular, cholesteric, lamellar, bicontinuous or hexagonal structure.

5. Material according to claim 1, such that it has a specific surface area of between 100 and 1200 m²/g.

6. Material according to claim 1, such that said zeolitic nanocrystals comprise at least one zeolite that is selected from among the zeolites of MFI, BEA, FAU and LTA structural type.

7. Material according to claim 1, such that said zeolitic nanocrystals comprise at least one zeolite that is entirely silica.

8. Material according to claim 1, such that said zeolitic nanocrystals comprise at least one zeolite that contains silicon and aluminum.

9. In an adsorbent comprising a mesostructured material, the improvement wherein the mesostructured material is one according to claim 1.

10. In a catalyst comprising a mesostructured material, the improvement wherein the mesostructured material is one according to claim 1.

11. Process for the preparation of a mesostructured material according to claim 1 that comprises $a_o$) the synthesis, in the presence of at least one structuring agent, of zeolitic nanocrystals of a maximum nanometric size that is equal to 300 nm so as to obtain a colloidal solution within which said nanocrystals are dispersed; a') the mixing in solution of at least one surfactant, at least one aluminum precursor, and optionally at least one silica precursor, and at least one colloidal solution that is obtained according to $a_o$); b') the aerosol spraying of the solution that is obtained in stage a') to lead to the formation of spherical droplets with a diameter that is less than or equal to 200 μm; c') the drying of said droplets, and d') the elimination of said surfactant and said structuring agent for obtaining the mesostructured material.

12. Process for the preparation of a mesostructured material according to claim 1 comprising a") the mixing in solution of at least one surfactant, at least one aluminum precursor, optionally at least one silica precursor, and zeolitic crystals that are dispersed in the form of nanocrystals of a maximum nanometric size that is equal to 300 nm in said solution; b") the aerosol spraying of said solution that is obtained in stage a") to lead to the formation of spherical droplets of a diameter that is less than or equal to 200 μm; c") the drying of said droplets and d") the elimination of at least said surfactant for obtaining the mesostructured material.

* * * * *